United States Patent Office 3,063,945
Patented Nov. 13, 1962

3,063,945
STABILIZED NITRIC ACID
Jennings P. Blackwell, Bartlesville, Okla., assignor to Phillips Petroleum Company, a corporation of Delaware
No Drawing. Filed Aug. 12, 1959, Ser. No. 833,351
14 Claims. (Cl. 252—186)

This invention relates to stabilized nitric acid. In one aspect this invention relates to the stabilization of concentrated nitric acid. In another aspect this invention relates to a stabilized oxidizer mixture comprising nitric acid and an organic sulfone.

Concentrated nitric acids such as are sold in the form of ordinary concentrated acid, white fuming nitric acid (WFNA), red fuming nitric acid (RFNA), and anhydrous nitric acid are important commercial products. These materials have many important uses such as for the preparation of fertilizers, in cleaning and etching solutions, etc. In recent years, said concentrated nitric acids have been used as oxidizer ingredient for rocket propellants, in both bipropellant applications and in monopropellant applications. When used as the oxidizer component in a bipropellant system, the acid is carried in the rocket or missile in a separate compartment or tank and is injected into the combustion chamber of the rocket motor as a separate stream where it contacts the fuel component, also injected as a separate stream. Said fuel component can be a hypergolic fuel, such as aniline, in which case spontaneous ignition takes place upon contact between the acid and the hypergolic fuel. Said fuel can also be a non-hypergolic fuel in which case the mixture formed when the acid and fuel are contacted is ignited by any suitable means such as a spark igniter. Monopropellant compositions consisting essentially of a fuel component, such as an amine nitrate, dissolved in nitric acid represent another application for said acids. In this type of application the monopropellant is stored in a tank carried by the rocket and is injected into the combustion chamber of said rocket where it is ignited.

Nitric acids, particularly concentrated nitric acids are not stable during storage, and tend to decompose according to the reaction:

$$4HNO_3 \rightarrow 4NO_2 + 2H_2O + O_2$$

Such decomposition of nitric acid during storage not only decreases the oxidizing power of the acid but also builds up pressure in the storage vessel. Over a period of time, gas pressure can build up in the storage vessel to a point which constitutes a serious hazard, and can sometimes even result in rupture of the storage vessel. Even when the acid is stored in a vented vessel so that storage pressure is of no concern, the loss in product quality which occurs upon prolonged storage is serious. Thus, it is important for all uses of nitric acid that, if possible, said acid be stabilized to reduce decomposition during storage. Stabilization is particularly important where the acid must be stored in closed containers, such as in the fuel tanks in a rocket motor, etc.

I have discovered that organic sulfones are effective stabilizers for nitric acid. Thus, broadly speaking, the present invention resides in a stabilized nitric acid containing a small but effective amount of an organic sulfone.

An object of this invention is to provide a stabilized nitric acid. Another object of this invention is to provide an improved oxidizer mixture which is suitable for use in reaction motors, such as rocket motors, etc. Still another object of this invention is to provide a stabilized nitric acid which can be safely stored in closed containers. Other aspects, objects, and advantages of the invention will be apparent to those skilled in the art in view of this disclosure.

Thus, according to the invention, there is provided a stabilized nitric acid consisting essentially of nitric acid and from about 0.001 to about 10 weight percent of at least one organic sulfone characterized by a formula selected from the group consisting of

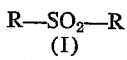
(I)

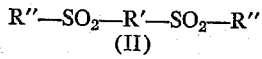
(II)

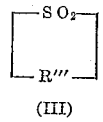
(III)

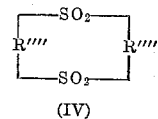
(IV)

where: in Formula I each R is selected from the group consisting of alkyl radicals containing from 1 to 11 carbon atoms and cycloalkyl radicals containing from 5 to 8 carbon atoms; in Formula II R' is an alkylene radical containing from 3 to 10 carbon atoms, and each R" is selected from the group consisting of alkyl radicals containing from 1 to 8 carbon atoms and cycloalkyl radicals containing from 5 to 8 carbon atoms; in Formula III R''' is an alkylene radical containing from 4 to 12 carbon atoms and wherein the number of atoms in the ring is from 5 to 9; in Formula IV each R'''' is an alkylene radical containing from 1 to 11 carbon atoms and wherein the number of atoms in the ring is from 5 to 9; and wherein, in each of said Formulas I, II, III, and IV the total number of carbon atoms does not exceed 12.

Examples of sulfones which are useful in the practice of this invention include, among others, the following:

Dimethyl sulfone
Diethyl sulfone
Methyl ethyl sulfone
Ethyl cyclohexyl sulfone
Di-n-hexyl sulfone
Diisopropyl sulfone
Ethyl decyl sulfone
Dicyclohexyl sulfone
Hendecyl methyl sulfone
3,4,5-trimethyloctyl methyl sulfone
Ethyl cyclooctyl sulfone
Dicyclopentyl sulfone
Tetramethylene sulfone (sulfolane)
Hexamethylene sulfone
3,6-dimethylhexamethylene sulfone
Octamethylene sulfone
5-propyloctamethylene sulfone
2,4-dimethylhexamethylene sulfone
3,6-dimethyloctamethylene sulfone
2,5-diethylheptamethylene sulfone
1,3-di(methylsulfonyl)propane
1,3-di(tertiary butylsulfonyl)propane
1,4-di(ethylsulfonyl)butane
1,6-di(n-propylsulfonyl)hexane
1-methylsulfonyl-8-propylsulfonyloctane
1,10-di(methylsulfonyl)decane
1-cyclohexylsulfonyl-3-methylsulfonylpropane
1-cyclooctylsulfonyl-3-methylsulfonylpropane
1,3-dithiacyclopentane-1,1,3,3-tetroxide 2-isopropyl-3-(2-ethylbutyl)-1,4-dithiacyclopentane-1,1,4,4-tetroxide
1,5-dithiacyclooctane-1,1,5,5-tetroxide
3,7-dimethyl-1,5-dithiacyclooctane-1,1,5,5-tetroxide
1,5-dithiacyclononane-1,1,5,5-tetroxide
1,4-dithiacyclohexane-1,1,4,4-tetroxide (also called 1,4-dithiane disulfone)

The organic sulfone compounds used in the practice of the invention can be prepared by any of a number of suitable methods well known to those skilled in the art. Commonly, sulfones have been prepared by reaction of a variety of oxidizing agents upon the corresponding sulfides or sulfoxides. The oxidizing agents employed include fuming nitric acid, hydrogen peroxide, chromic acid, peracetic acid and the like. For example, dimethyl sulfide can be oxidized to dimethyl sulfone, di-n-butyl sulfide yields di-n-butyl sulfone, and iso-pentyl ethyl sulfide yields iso-pentyl ethyl sulfone.

Sulfones can also be prepared by sulfonation-type reactions wherein the reaction mixture is kept essentially anhydrous by removal of the water which is formed during the reaction. Water removal can be effected by distillation or by reaction with a desiccant such as phosphorus pentoxide. For example, cyclohexane can be reacted with sulfur trioxide in the presence of phosphorus pentoxide to yield dicyclohexyl sulfone.

Many unsymmetrical sulfones have been prepared by passing a first gaseous hydrocarbon through a sulfonic acid derivative of a second hydrocarbon at temperatures in the range of 125 to 200° C. Water is removed by sweeping with excess gaseous hydrocarbon.

Sulfones have also been produced by decomposition of carboxylic acids which have a sulfonyl group attached to the alpha carbon atom. Methylsulfonylacetic acid can be thermally decomposed at 200° C. to yield dimethyl sulfone. Similarly, α-ethylsulfonylpropionic acid yields diethyl sulfone. Diethyl sulfone has also been prepared by reaction of sulfur dioxide with diethyllead.

In still another method of preparation, dienes are reacted with sulfur dioxide in the presence of stabilizing agents such as polyhydric phenols. Cyclic, unsaturated sulfones result which can be converted by hydrogenation to the corresponding saturated compounds. These cyclic, saturated compounds are sometimes termed sulfolanes. For example, butadiene can be reacted wtih sulfur dioxide to yield a heterocyclic ring compound which can be hydrogenated to yield tetramethylene sulfone, which is sometimes simply called sulfolane.

The organic sulfones are effective as stabilizers for nitric acids when used in small amounts. Generally, the amount used to stabilize the nitric acid is in the range of 0.1 to 10 percent, preferably within the range of about 0.1 to 5 percent, by weight of the total solution. However, amounts as small as 0.001 percent by weight can be used with beneficial results. The invention is applicable for stabilizing nitric acid of any concentration ranging from dilute acids containing as little as 1 weight percent $HNO_3$ up to and including anhydrous acids containing essentially 100 weight percent $HNO_3$. However, since the more concentrated acids are more unstable, the invention finds its greatest use in stabilizing the more concentrated acids, particularly those containing at least about 50 weight percent, or more, $HNO_3$. The invention is particularly applicable for stabilizing the concentrated white fuming nitric acids, red fuming nitric acids, and anhydrous nitric acid which are available commercially. White fuming nitric acid usually contains about 90 to 99 weight percent $HNO_3$, from 0 to 2 weight percent $NO_2$, and up to about 10 weight percent water. Red fuming nitric acid usually contains about 70 to 90 weight percent $HNO_3$, from 2 to 25 weight percent $NO_2$, and up to about 10 weight percent water. Fuming nitric acids, both white and red, having concentrations of water $NO_2$ and $HNO_3$ different from those given can, of course, be stabilized in accordance with the invention.

In the practice of the invention the acid to be stabilized can be mixed with one or more of the above-described organic sulfones in any convenient manner. It is generally preferred to add the organic sulfone to the acid at temperatures below about 50° C., e.g., 0 to 30° C., with good agitation. The resulting acid solutions have an enhanced stability as measured, for example, by measuring changes in pressure in a closed container containing the acid solutions in storage.

The following example will serve to further illustrate the invention.

*Example*

Anhydrous nitric acid was prepared by distilling red fuming nitric acid in the presence of sulfuric acid. Analyses of typical batches of a distilled anhydrous nitric acid showed that the product contained more than 99.8 weight percent $HNO_3$ and less than 0.2 weight percent oxides of nitrogen.

The effectiveness of the organic sulfones as stabilizing agents for nitric acid is shown by a comparison of the storage stability at 200° F. of a sample (9.9 grams) of said acid having dissolved therein 1 weight percent of tetramethylene sulfone, with another sample of said acid containing no stabilizing agent. The storage stability of said two samples was determined according to the following procedure.

A small glass tube constructed from one-fourth inch I.D. glass pipe, which will withstand a pressure greater than 1,000 p.s.i., is filled about two-thirds full (about 6 milliliters) with the nitric acid to be tested. Said tube is fitted with a safety head containing a blowout disc which will rupture at about 200 p.s.i. pressure. The small glass bomb is then placed in a constant temperature bath containing cold water and is connected to a pressure recorder and to a supply of compressed nitrogen gas. The pressure in said bomb is then increased to about 75 p.s.i.g. with nitrogen to check the system for leaks and, after checking, the pressure in said bomb is reduced to 20 p.s.i.g. The temperature in the constant temperature bath, which can be regulated to maintain a temperature of 200° F., is increased and the time at which a temperature of 200° F. is reached is taken as the start of the test. The test is terminated when the pressure in said bomb exceeds 100 p.s.i., or when the blowout disc is ruptured (the pressure rise is often rapid after 100 p.s.i. is reached). The storage life of the acid being tested is recorded as the time neecssary for the pressure in said bomb to increase from 20 to 100 p.s.i. at a temperature of 200° F.

The results of the above tests showed that the pressure in the bomb containing the acid stabilized with tetramethylene sulfone increased to 90 p.s.i.g. during the first 24 hours of the test and then decreased slowly to 35 p.s.i.g. during the succeeding 689 hours after which the test was terminated. Thus, the stabilized acid had a storage life greater than 713 hours. The pressure in the bomb containing the sample of unstabilized nitric acid increased to 61 p.s.i.g. in 9 hours and the test was terminated after 28 hours when the pressure in said bomb had reached 100 p.s.i.g. Thus, the unstabilized acid had a storage life of only 28 hours.

The above tests show that the nitric acid stabilized with tetramethylene sulfone had a storage life more than 25 times longer than the unstabilized nitric acid.

Since many possible embodiments can be made of this invention without departing from the scope thereof, it is to be understood that all matter herein set forth is to be interpreted as illustrative and not in a limiting sense.

I claim:

1. A stabilized nitric acid consisting essentially of nitric acid and from about 0.001 to about 10 weight percent of at least one organic sulfone compound characterized by a formula selected from the group consisting of

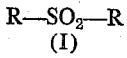
(I)

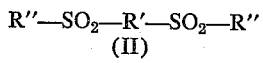
(II)

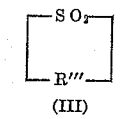
(III)

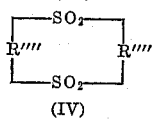
(IV)

where: in Formula I each R is selected from the group consisting of alkyl radicals containing from 1 to 11 carbon atoms and cycloalkyl radicals containing from 5 to 8 carbon atoms; in Formula II R' is an alkylene radical containing from 3 to 10 carbon atoms; and each R'' is selected from the group consisting of alkyl radicals containing from 1 to 8 carbon atoms and cycloalkyl radicals containing from 5 to 8 carbon atoms; in Formula III R''' is an alkylene radical containing from 4 to 12 carbon atoms and wherein the number of atoms in the ring is from 5 to 9; in Formula IV each R'''' is an alkylene radical containing from 1 to 11 carbon atoms and wherein the number of atoms in the ring is from 5 to 9; and wherein, in each of said Formulas I, II, III and IV the total number of carbon atoms does not exceed 12.

2. A stabilized nitric acid according to claim 1, wherein the nitric acid to be stabilized contains at least 50 weight percent $HNO_3$.

3. A stabilized nitric acid according to claim 1 wherein the nitric acid to be stabilized contains at least 70 weight percent $HNO_3$.

4. The stabilized nitric acid of claim 1 wherein said organic sulfone is tetramethylene sulfone.

5. The stabilized nitric acid of claim 1 wherein said organic sulfone is hexamethylene sulfone.

6. The stabilized nitric acid of claim 1 wherein said organic sulfone is diethyl sulfone.

7. The stabilized nitric acid of claim 1 wherein said organic sulfone is di-n-propyl sulfone.

8. The stabilized nitric acid of claim 1 wherein said organic sulfone is di-cyclohexyl sulfone.

9. The stabilized nitric acid of claim 1 wherein said organic sulfone is 1,5-dithiacyclooctane-1,1,5,5-tetroxide.

10. The stabilized nitric acid of claim 1 wherein said organic sulfone is octamethylene sulfone.

11. A stabilized nitric acid according to claim 2 wherein the amount of said organic sulfone is within the range of about 0.1 to 10 weight percent.

12. A stabilized nitric acid according to claim 2 wherein the amount of said organic sulfone is within the range of 0.1 to about 5 weight percent.

13. The stabilized nitric acid of claim 4 wherein said acid contains at least 50 weight percent $HNO_3$.

14. The stabilized nitric acid of claim 4 wherein said acid contains at least 70 weight percent $HNO_3$.

References Cited in the file of this patent

UNITED STATES PATENTS 2,749,317    Pino ------------------ June 5, 1956